UNITED STATES PATENT OFFICE.

EDWARD RICHTER, OF PLAUEN, GERMANY.

PROCESS OF PREPARING AN OIL.

1,076,703. Specification of Letters Patent. Patented Oct. 28, 1913.

No Drawing. Application filed October 16, 1912. Serial No. 726,155.

*To all whom it may concern:*

Be it known that I, EDWARD RICHTER, a subject of the King of Prussia, residing at Plauen, in the Voigtland, Germany, have invented certain new and useful Improvements in Processes of Preparing an Oil, of which the following is a full, clear, and exact specification.

If salicylate of sodium, hydrochlorate of quinin, ethyl-ester of the carbamic acid and sodium diiodo-p-phenol sulfonate are mixed in equal parts, after the salts have been well triturated, the triturated substances then dissolved in a small quantity of water, the moist mixture thus obtained heated in a test tube and first a 10% sulfuric acid, and subsequently a 50% sulfuric acid is added, it will be observed, that a thick oily body settles at the bottom of the heated tube, which oily body will still remain oily at about 20° centigrade.

Example: 1.5 gram of salicylate of sodium and 0.5 gr. each of ethyl-ester of the carbamic acid and of hydrochlorate of quinin, respectively, are mixed and triturated with each other, the mixture is then placed into a test tube, 2 ccm. of distilled water is added, and thereupon first, 0.8 ccm. of a ten per cent. sulfuric acid and then 0.3 ccm. of a fifty per cent. sulfuric acid is added and the whole is carefully heated, a light yellow oil will then settle at the bottom of the tube. The yield of this oily body will be about 2.5 ccm. The addition of the sodium diiodo-p-phenol sulfonate is not imperative. The form of the oily body obtained and its quantity are always constant. The heavy oily body thus obtained has the characteristic property of absorbing certain metal oxids and protoxids from sulfate solutions, and also anilin dyes and other dyes. As hereinbefore said certain metal oxids and protoxids will be absorbed by the oil. If, for instance the solution of a metal oxid or protoxid such as solution of hydrated ferrous carbonate (mineral water) is substituted for the water in the above example, the protoxid will be drawn down into the oil forming, and in consequence of the ferrous compound the oil will assume a reddish brown color. The same will be the case if ferrous oxid is added in a solid form to the above example. A dye which suffers the same absorption is eosin. If any of such substances which will be absorbed, are contained in the sulfuric acid added in a diluted condition, they will be greedily absorbed by the oily body formed in the above described process, so that the oil is practically dyed *in statu nascendi*. The oil behaves in this respect similar to lac.

Another characteristic feature of the oil product is the following: If the separated warm oil is poured into a porcelain dish, it may be triturated with elements such as sulfur, carbon, mercury, so that the oil will gradually assume a resinous viscid consistence. Instead of with elements it can also be triturated with other chemical dyes, such as minium, zinc oxid, oxid of manganese and the like or also with anilin dyes. The oil thus acts in both cases as color lac. But it may also be used for preparing with its aid fat-free salves by discontinuing the trituration before perfect dryness is obtained, or continuing the treatment with American vaseline. The triturations with elements such as sulfur, carbon or mercury may also be used by submitting them to a further treatment with chemicals. By the hereinbefore described methods it is possible to prepare chemical medicines and medicinal preparations which may be used against affections of the skin, cancer or lues.

The oily body when mixed with quicksilver metal forms an excellent remedy for syphilis and when mixed with arsenic and other chemicals a remedy for infectious diseases of a general nature.

I claim:

The process of preparing an oily body by mixing salicylate of sodium, a hydrochlorate of quinin, ethyl-ester of the carbamic acid, adding a small quantity of water and thereupon adding a small quantity of a ten per cent. sulfuric acid, and finally again a small quantity of the sulfuric acid at a concentration of fifty per cent. and carefully heating the whole.

In testimony whereof I affix my signature in presence of two witnesses.

EDWARD RICHTER.

Witnesses:
HERTA RICHTER,
JOHANNE GÜNTHER.

Copies of this patent may be obtained for five cents each, by addressing the "Commissioner of Patents, Washington, D. C."